United States Patent
Diagarajan et al.

(10) Patent No.: US 12,287,805 B2
(45) Date of Patent: Apr. 29, 2025

(54) DATA QUALITY ASSURANCE FOR HETEROGENOUS DATA MIGRATION IN CLOUDS

(71) Applicant: ATOS France, Bezons (FR)

(72) Inventors: Gayathri Diagarajan, Tamil Nadu (IN); Siva Kannan, Tamilnadu (IN)

(73) Assignee: BULL SAS, Les Clayes sous Bois (FR)

( * ) Notice: Subject to any disclaimer, the term of this patent is extended or adjusted under 35 U.S.C. 154(b) by 0 days.

(21) Appl. No.: 18/381,725

(22) Filed: Oct. 19, 2023

(65) Prior Publication Data
US 2024/0134875 A1    Apr. 25, 2024
US 2024/0232215 A9    Jul. 11, 2024

(30) Foreign Application Priority Data
Oct. 21, 2022    (EP) .................................... 22203013

(51) Int. Cl.
*G06F 16/25*     (2019.01)
*G06F 16/27*     (2019.01)

(52) U.S. Cl.
CPC ............ *G06F 16/254* (2019.01); *G06F 16/27* (2019.01)

(58) Field of Classification Search
CPC ...... G06F 16/254; G06F 16/27; G06F 16/214; G06F 16/9535; G06F 16/9538; G06F 16/93; G06F 16/9038
See application file for complete search history.

(56) References Cited

U.S. PATENT DOCUMENTS

| | | | |
|---|---|---|---|
| 9,811,527 B1 * | 11/2017 | Esposito | G06F 16/214 |
| 11,893,037 B1 * | 2/2024 | Chidurala | G06F 16/254 |
| 12,001,416 B1 * | 6/2024 | Cwalina | G06F 16/435 |
| 2013/0110770 A1 * | 5/2013 | Stevelinck | G06F 16/214 |
| | | | 707/609 |
| 2019/0318272 A1 * | 10/2019 | Sassin | G06N 20/00 |

(Continued)

OTHER PUBLICATIONS

European Search Report for corresponding European Application No. 22203013.2 , dated Mar. 3, 2023.

(Continued)

*Primary Examiner* — Etienne P Leroux
*Assistant Examiner* — Oscar Wehovz
(74) *Attorney, Agent, or Firm* — MEAGHER EMANUEL LAKS GOLDBERG & LIAO, LLP (57) ABSTRACT

Method for controlling data quality assurance after a migration between a source repository, which includes source data associated with a source data structure, and a target repository, which includes target data associated with a target data structure, according to migration rules. The target data is organized as a set of elements. The method includes simulating the migration by applying migration rules to source data so as to output simulated data according to the target data structure, where the simulated data is organized as a set of elements. The method includes merging the simulated data and the target data by excluding identical elements, to form an input vector for a machine learning algorithm. The method includes applying the machine learning algorithm for pairing elements of the input vector according to a similarity score and determining a discrepancies indicator according to the similarity score for each element of the input vector.

11 Claims, 2 Drawing Sheets

(56) References Cited

U.S. PATENT DOCUMENTS

2021/0224258 A1* 7/2021 Faruquie ............... G06F 16/244
2021/0360064 A1* 11/2021 Dennis ................ H04L 67/1095

OTHER PUBLICATIONS

Eppstein, "MinHash", XP093028506, URL: https://en.wikipedia.org/w/index.php?title=MinHash&oldid=1092792526, Jun. 12, 2022.
European Search Report for corresponding European Patent Application No. 22203013.2, dated Mar. 3, 2023.
Eppstein, David, "MinHash," Wikipedia, pp. 1-8, https://en.wikipedia.org/w/index.php?title=MinHash&oldid=1092792526, Jun. 12, 2022.

* cited by examiner

DATA QUALITY ASSURANCE FOR HETEROGENOUS DATA MIGRATION IN CLOUDS

TECHNICAL FIELD

The invention relates to the field of data migration between a source repository to a target repository. In particular, but not only, it relates to migration between distinct data structure paradigms, and more particularly to migration of data to non-relational databases.

It applies, for instance, to migration of data towards cloud.

BACKGROUND

Digital transformation involves modernization and migration of data from a legacy system to a new system, including data repository system distributed over multiple locations like a data cloud. Not only the locations of the source and target data are different, but also (and most importantly) the data structures are different, so that the migration process needs to transform data and somehow to take decisions on how to format and align migrated data in the target repository. A data structure is the organization and implementation of values and information. In simple words, it is the way of organizing information in a computer so that it can be more easily understood and worked with. Data structure is defined with more details in the related Wikipedia page: http://www.wikipedia.org/wiki/Data_structure During such transformations, huge amount of data (millions of terabytes) is migrated to, notably, cloud storage.

One can easily understand that, statistically, such migrations are prone to involve mistakes and inconsistencies within the migrated data.

Quality engineering teams play a significant role to achieve a full data validation accuracy, as any mismatch in the resulting target data could result in huge losses in terms of costs, business, and customer experience for enterprises.

So, maintaining data quality is one of the biggest challenges for any data migration and modernization program. As part of data quality assurance, data accuracy, data consistency, data integrity, data timeliness should be thoroughly validated when migration happens from a legacy system to a newer system/application, including on the cloud. Poor validation of data may imply huge delay in time-to-market, significant cost to post-migration maintenance, issues ranging from poor business intelligence to delay or disruption in business processes.

While migrating data to a cloud infrastructure, relational databases of the legacy system can be transformed and migrated to non-relational databases.

This is usually the case for distributed databases, like cloud infrastructures, wherein data can be stored in various server machines, making it impossible to manage relations between tables. Distribution allows to reduce the jitter and the workload of datacenters, improving the availability of the data and the overall performances. Such arrangements are usually called "NoSQL" databases.

Then, data are not stored in tabular form but as documents formatted under JSON or XML specifications, for instance, without relation or binding conditions.

Performing data validation and comparison of source and target for such scenario is not possible using the primary key concept like in relational database to relational database migration, since target documents/JSON/XML do not contain any primary keys.

SUMMARY

There exists thus some needs for support the migration and the transformation of data from a data source to a non-relational database while assuring data quality assurance.

In a first example embodiment, it is proposed a method for controlling data quality assurance after a migration between a source repository, comprising source data associated with a source data structure, and a target repository, comprising target data associated with a target data structure, said migration comprising one or more of an Extract, Load and Transform, ELT, or Extract, Transform and Load, ETL, process, according to which source data are extracted, transformed and loaded into a data warehouse (22, 23) before being migrated into target data according to migration rules, wherein said target data is organized as a set of elements;

said method comprising
    simulating said migration by applying said migration rules to source data of said source repository so as to output simulated data according to said target data structure, wherein said simulated data is organized as a set of elements;
    merging said simulated data and said target data by excluding identical elements, to form an input vector for a machine learning algorithm;
    applying said machine learning algorithm for pairing elements of said input vector according to a similarity score;
    determining discrepancies indicator according to said similarity score for each element of said input vector.

This embodiment may comprise other features, alone or in combination, such as:
    said source repository is a relational database or flat files, which can be deployed in a premise or in a cloud.
    said target repository is a JSON or XML data repository or tables/flat files without primary keys.
    said machine learning algorithm is a Minhash LSH algorithm.
    a similarity score is determined for each pair between an element of said simulated data and an element of said target data and elements are paired when said similarity score is above a given threshold.
    said target repository is in a cloud or in premise.
    the method further comprises comprising steps of extraction and preprocessing said simulated data and said target data, wherein preprocessing comprises handling of missing values, trimming of white spaces, selecting common columns and converting each column values to arrays of strings.
    the method further comprises a step of performing a root cause analysis of elements of said input vector that have not been paired.
    the method further comprises a step of reporting, comprising grouping elements of said input vector according to said similarity score and to a type of failure.

In another example embodiment, the invention relates to a computer program comprising instructions which, when the program is executed by a computer, cause the computer to carry out the steps of the method as previously defined.

In another example embodiment, the invention relates to an apparatus for controlling data quality assurance after a migration between a source repository, comprising source data associated with a source data structure, and a target repository, comprising target data associated with a target data structure, according to migration rules, wherein said target data is organized as a set of elements;

said apparatus comprising means for
- simulating said migration by applying said migration rules to source data of said source repository so as to output simulated data according to said target data structure, wherein said simulated data is organized as a set of elements;
- merging said simulated data and said target data by excluding identical elements, to form an input vector for a machine learning algorithm;
- applying said machine learning algorithm for pairing elements of said input vector according to a similarity score;
- determining discrepancies indicator according to said similarity score for each element of said input vector.

According to embodiments, the means may comprise—
- at least one processor; and
- at least one memory including computer program code, the at least one memory and computer program code configured to, with the at least one processor, cause the performance of the apparatus.

BRIEF DESCRIPTION OF THE FIGURES

Some embodiments are now described, by way of example only, and with reference to the accompanying drawings, in which:
- The FIG. 1 schematically illustrates a context wherein embodiments of the invention may be deployed,
- The FIG. 2 shows an example of a migration between data of an example source repository 1 and an example of target repository 2.
- The FIG. 3 illustrates an embodiment of the data quality assurance process which can be performed by a data quality assurance module.

DESCRIPTION OF EMBODIMENTS

Figure 1:
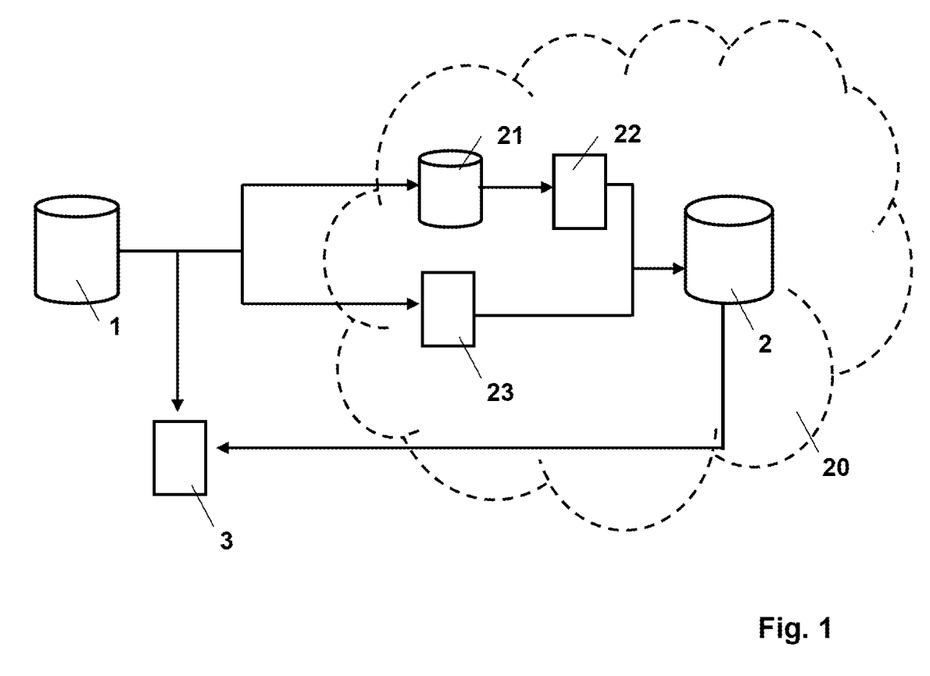

In reference to FIG. 1, data are migrated from a source repository 1 to a target repository 2.

The format of the source repository 1 may be various and depends on the history of the owner of the database. Depending on its age, various technologies may have been used to store the data of the source repository.

For instance, the source repository 1 may be a relational database (or RDBMS for Relational DataBase Management System), or flat files. It may be deployed in a cloud or in a premise.

The target repository 2 is typically a non-relational database deployed over a cloud 20. It may also be a non-relational database deployed in a premise. It can also be relational database deployed either in cloud or in premise (with tables having no primary keys defined in it).

As explained in Grolinger, K.; Higashino, W. A.; Tiwari, A.; Capretz, M. A. M. (2013). "Data management in cloud environments: NoSQL and NewSQL data stores", in Journal of Cloud Computing: Advances, Systems and Applications 2013: "Today, businesses generate massive volume of data which has grown too big to be managed and analyzed by traditional data processing tools. Indeed, traditional relational database management systems (RDBMS) were designed in an era when the available hardware, as well as the storage and processing requirements, were very different than they are today. Therefore, these solutions have been encountering many challenges in meeting the performance and scaling requirements of this "Big Data" reality. [ . . . ] Faced with the challenges that traditional RDBMSs encounter in handling Big Data and in satisfying the cloud requirements described above, a number of specialized solutions have emerged in the last few years in an attempt to address these concerns. The so-called NoSQL and NewSQL data stores present themselves as data processing alternatives that can handle this huge volume of data and provide the required scalability."

Non-relational databases are further described on the corresponding Wikipedia page: https://en.wikipedia.org/wiki/NoSQL Among Non-relational databases, one can cite for instance JSON-based databases.

JSON stands for "JavaScript Object Notation" and is an open standard file format and data interchange format that uses human-readable text to store and transmit data objects consisting of attribute-value pairs and arrays (or other serializable values). It is a common data format with diverse uses in electronic data interchange, including that of web applications with servers.

A JSON database is arguably the most popular category in the NoSQL family of databases. NoSQL JSON databases handle documents as individual data file objects without using structured tables.

Other types of NoSQL databases exist like those based on XML (eXtensible Markup Language), Avro, Copybook Cobol, etc.

The migration towards a non-relational database 2 on a cloud 20 may undergo different processes including ELT and ETL.

In computing, extract, transform, load (ETL) is a three-phase process where data is extracted, transformed (cleaned, sanitized, scrubbed) and loaded into an output data container.

A properly designed ETL system extracts data from source systems and enforces data type and data validity standards and ensures it conforms structurally to the requirements of the output. Some ETL systems can also deliver data in a presentation-ready format so that application developers can build applications and end users can make decisions.

The ETL process became a popular concept in the 1970s and is often used in data warehousing. ETL systems commonly integrate data from multiple applications (systems), typically developed and supported by different vendors or hosted on separate computer hardware.

Further explanations about ETL process can easily be found in the technical literature, while an easy entry point may be the related Wikipedia page: https://en.wikipedia.org/wiki/Extract,_transform,_load Extract, load, transform (ELT) is an alternative to extract, transform, load (ETL) used with data lake implementations. In contrast to ETL, in ELT models the data is not transformed on entry to the data lake, but stored in its original raw format. This enables faster loading times. However, ELT requires sufficient processing power within the data processing engine to carry out the transformation on demand, to return the results in a timely manner. Since the data is not processed on entry to the data lake, the query and schema do not need to be defined a priori (although often the schema will be available during load since many data sources are extracts from databases or similar structured data systems and hence have an associated schema).

Basically, a data lake is a system or repository of data stored in its natural/raw format. This concept is well described in the technical literature and the corresponding Wikipedia page may constitute a relevant entry point: https://en.wikipedia.org/wiki/Data_lake In FIG. 1, through the ELT process, data are extracted and fed to a data lake 21, and then loaded in a data warehouse 22. Post transformation at the data warehouse 22, data are migrated to target repository 2.

Through the ETL process, the extracted data is aligned and transformed to business objectives in a staging area and then loaded into a data warehouse 23. From there, data are migrated to the target data repository 2.

The ELT and the ETL processes are prone to generate data quality issues, especially because these processes imply many data manipulations: ingestion to a data lake, transformation from one format to another (e.g. JSON, XML, Documents), loading into NoSQL database, etc. The more manipulation, the higher the risk of impacting the resulting data quality.

The migration (or transformation) from source repository 1 to target repository 2 is performed by automatic or semi-automatic processes according to migration rules (or "business rules")

The migration rules define how to map data from the source repository 1 into the structure of the target repository 2. It may also specify some data manipulations (formatting data, joining tables, transforming from numerical values to alphanumerical chains or vice-versa, etc.).

This mapping may depend on choices of the users, according e.g. to the desirable repository data structure. The migration rules may then describe how tables or columns are migrated to the repository data structure.

To some extent, tools may be deployed to automatize the migration process and data validation automation has to be scripted if it involves cloud and migration tools. Such tools take input as the source repository 1 and applies the migration rules (expressed in an interpretable way) so as to generate the corresponding data relevant for the target repository 2. Data experts and engineers may also intervene for more complex scenarios.

Figure 2:
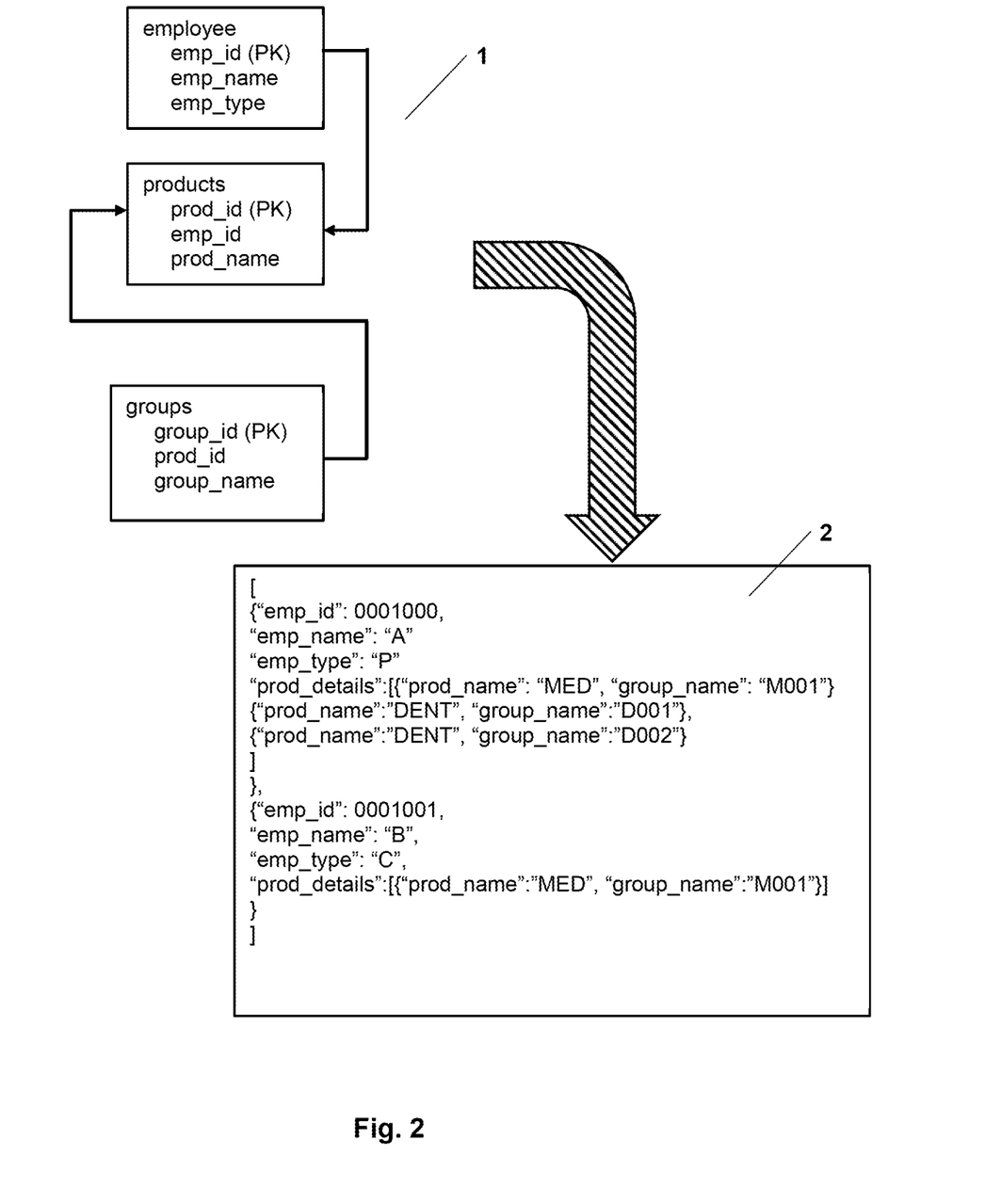

FIG. 2 shows an example of such a migration between data of an example source repository 1 (which is a relational database in this case) and a target repository 2, which is a collection of JSON documents.

The source repository database comprises 3 tables, namely "employee", "products" and "groups", each of them having one primary key, PK, respectively "emp_id", "prod_id", "group_id". The 3 tables further contain other columns, including foreign keys, establishing relationships between tables.

The target repository 2 is a JSON textual document, wherein each employee is listed as a data structure embedding linked data coming from other source tables.

In the example, 2 employees are listed (0001000 and 0001001 being their "emp_id"). The data structure associated by the second employee comprises an associated "emp_name" (coming from the "employee" source table), an associated "emp_type" (coming from the "employee" source table), and product details formed of a single "prod name" and "group name" association (coming from, resp., "products" and "groups" source tables).

Migration (or business) rules may define how each column of each table of the relational database shall be migrated to a target structure.

For instance, based on the example of FIG. 2, some migration rules may be written as in the following table:

| Migration table | Migration column | Migration rule | Data Type | Max Length | Allowable values |
|---|---|---|---|---|---|
| employee | emp_id | Add 3 leading zeros for identifiers less than 5 digits | Numeric | 10 | |
| employee | emp_name | Direct | Alphabet | | |
| employee | emp_type | Direct | Alphabet | 3 | P, T, C |
| products | prod_id | Direct | Numeric | 5 | |
| products | emp_id | LEFT JOIN with employee table | Numeric | 10 | |
| products | prod_name | Direct | Alphabet | | MED, DENT |
| groups | group_id | Direct | Numeric | 5 | |
| groups | prod_id | Left Join with products table | Numeric | 5 | |
| groups | group_name | Direct | Alphanumeric | | MED - M001, M002 DENT - D001, D002 |

Of course, the management rules may comprise further rules. Each could be described as a row of such a table, or according to other formats allowing automatization.

In general, we call "element" such a record in the target data, which may be "rows" in case of a tabular data structure. The target data structure is thus organized as a set of such elements (for examples, a set of rows).

In addition to these usual processes, according to the invention, a parallel process is put in place, comprising measuring a data migration quality by a data quality assurance module (or process) 3.

This data quality assurance module (or process) takes as input data from both the source repository 1 and from the target repository 2. Basically, it aims in comparing the results of the (actual) migration to the target repository 2 with an "ideal" migration, so as to detect any discrepancies.

This "ideal" migration comprises simulating the migration from the data structure of the source repository 1 to the data structure of the target repository 2.

This simulation aims at generating the same data values as the actual migration but does not undergo the ELT and/or ETL process and upload to a cloud, for instance. More, it does not comprise migrating the data to a target repository, but only to apply the migration rules to generate a same data structure as the target repository.

Therefore, all the technical issues implied by the migration processes, which may involve data corruption, are not put in place in the simulation step.

Furthermore, typically, an actual migration is undertaken by a first team (namely a development team), whereas the data quality assurance is undertaken by a second and different team (namely a quality engineering team).

These two paths (actual migration and simulation) are therefore of different natures.

Figure 3:
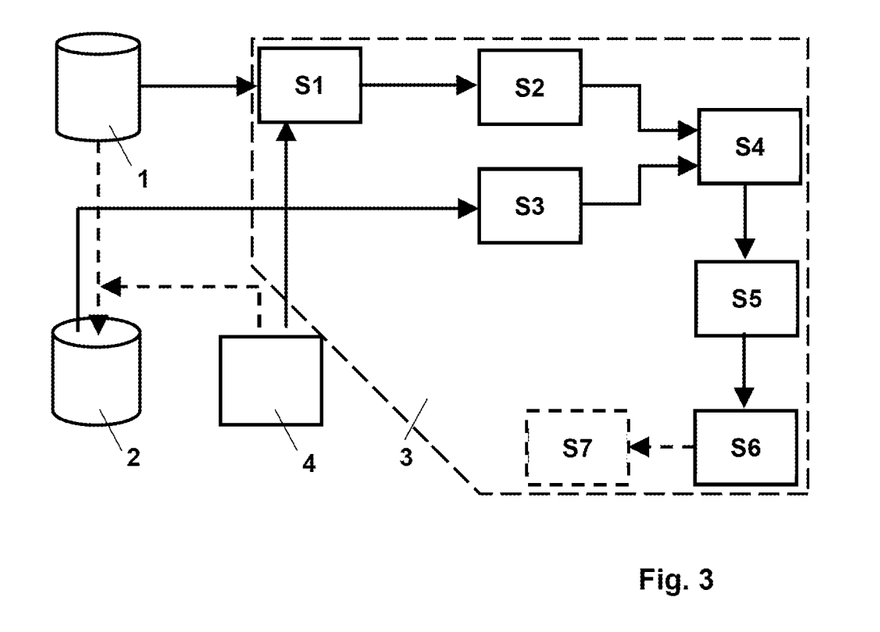

The FIG. 3 illustrates an embodiment of the data quality assurance process which can be performed by a data quality assurance module 3. Each of the steps S1-S7 can be embodied as a software module or as an independent software tool of a software suit or platform allowing to provide the data quality assurance feature.

On the most left side of the figure, the dotted arrow depicts the (actual) migration of the data of the source repository 1 to a target repository 2 according to migration rules 4 and as previously described.

The data quality assurance module 3 comprises a step (or module) S1 for simulating the migration by extracting and applying the same migration rules 4 to source data of the source repository 1, so as to output simulated data. As explained earlier, the simulated data complies with the target data structure (i.e. the data structure of the target repository 2).

Then, in step S2, the simulated data are preprocessed, in view of the subsequent steps, e.g. application of a machine-learning algorithm requiring a well-structured input vector.

According to embodiments, this preprocessing step S2 may comprise handling of missing values, trimming of white spaces, selecting common columns and converting each column values to arrays of strings.

Similarly, in step S3, the target data are extracted and preprocessed, in view of the subsequent steps, e.g. application of a machine-learning algorithm.

According to embodiments, the simulated data and the data of the target repository are read as data frames.

In a step S4, simulated data and target data are merged, and identical elements (e.g. rows) are excluded from the result of this step.

Both types of data share the same data structure, and can therefore easily be merged in a single entity. Then, elements of this entity can be checked in order to identify pairs of identical elements. These pairs correspond to data that have been correctly migrated so that the corresponding data in the target repository and in the simulated data are the same. Such data can then be sorted out since they cannot generate any discrepancies in the migrated data.

Once the pairs of identical elements have been excluded (both items of each pair), the resulting elements form a vector which can be inputted to a machine learning algorithm.

It shall be noticed that according to embodiments the preprocessing steps S2, S3 may take place before and/or after the merging step S4.

This input vector from S4 is constituted of elements that cannot be directly paired with another one, and thus represent potential discrepancies.

At step S5, a machine learning algorithm is applied for pairing these elements (e.g. rows) and finding the discrepancies according to a similarity score.

For doing so, according to embodiments, some transformation steps can be further put in place, including:
  String indexing: transforms columns with arrays of strings into numeric vectors,
  One Hot Encoder: maps a column of a category indices into a column of binary vectors,
  Vector Assembler: merges multiple columns into single vector column;
  Minhash LSH algorithm builds the model by converting single vector to hashed values.

Once the model is created, simulated data frame S2 is transformed and fitted using this created model. Similarly, the target data frame S3 is transformed and fitted using the same model.

At this stage, the data structure (input vector) comprises the rows that have not been already paired in the previous steps. They thus represent potential discrepancy in the data migration.

According to embodiments, the machine learning algorithm is a Minhash LSH algorithm.

According to the related Wikipedia page, "in computer science and data mining, MinHash (or the min-wise independent permutations locality sensitive hashing scheme) is a technique for quickly estimating how similar two sets are.

The scheme was invented by Andrei Broder (1997), and initially used in the AltaVista search engine to detect duplicate web pages and eliminate them from search results. It has also been applied in large-scale clustering problems, such as clustering documents by the similarity of their sets of words.

The Jaccard similarity coefficient is a commonly used indicator of the similarity between two sets. Let U be a set and A and B be subsets of U, then the Jaccard index is defined to be the ratio of the number of elements of their intersection and the number of elements of their union:

$$J(A, B) = \frac{|A \cap B|}{|A \cup B|}$$

This value is 0 when the two sets are disjoint, 1 when they are equal, and strictly between 0 and 1 otherwise. Two sets are more similar (i.e. have relatively more members in common) when their Jaccard index is closer to 1. The goal of MinHash is to estimate J(A,B) quickly, without explicitly computing the intersection and union.

Still according to Wikipedia, "locality-sensitive hashing (LSH) is an algorithmic technique that hashes similar input items into the same "buckets" with high probability. (The number of buckets is much smaller than the universe of possible input items.) Since similar items end up in the same buckets, this technique can be used for data clustering and nearest neighbor search. It differs from conventional hashing techniques in that hash collisions are maximized, not minimized. Alternatively, the technique can be seen as a way to reduce the dimensionality of high-dimensional data; high-dimensional input items can be reduced to low-dimensional versions while preserving relative distances between items.

As further explained in Wikipedia (https://en.wikipedia.org/wiki/Locality-sensitive hashing), Minhash can be used as a method for implementing the LSH algorithm.

Further documentation can be found in:
  https://george-jen.gitbook.io/data-science-and-apache-spark/locality-sensitive-hashing
  https://george-jen.gitbook.io/data-science-and-apache-spark/minhash-for-jaccard-distance
  https://www.databricks.com/session/locality-sensitive-hashing-by-spark During this step S5, pairs of elements can be constituted according to similarity score. According to embodiment this similarity score S may be determined from the Jaccard distance J by S=1−J.

According to embodiments, a threshold may be defined to which the similarity score could be compared.

If, for a given pair, the similarity score is below this threshold, then the pair can be discarded. Only pairs with a similarity score sufficiently high (e.g. higher to the given threshold) can be kept in the output of step 5.

These kept pairs constitute elements from simulated data and from the target data that are different (they would otherwise be discarded earlier in the process) but resembles to a high extent so that the data quality assurance module 3 can propose an automatic mapping, and thus an automatic correction.

A discrepancy indicator can be determined according to these similarity score in step S6.

In particular, when a similarity score is lower than a threshold, the elements cannot be matched. They may be categorized as "new elements" or "unmatched elements" and they correspond to a discrepancy that cannot be automatically corrected.

As said, when a similarity score is higher than a threshold, the elements can be automatically matched (potentially with some associated incertitude linked with said similarity score) and this indicates a discrepancy that can be automatically corrected.

An overall discrepancies indicator can be determined to reflect, for a whole migration, the similarity scores of all elements of the input vector. When the input vector is void, of course, this means that migration does not show any discrepancy and the discrepancy indicator reflects this situation.

At the end of this step S6, knowing the discrepancy indicators associated with elements (e.g. rows) which can be automatically corrected and which cannot be automatically corrected, the user may have a precise assessment of the migration between the source repository 1 to the target repository 2.

Then data quality assurance module 3 allows both to get such an assessment (as an overall discrepancies indicator) and to correct many discrepancies in an automatic way. In general, it improves the quality of the migrated data, which allows a better confidence in the migrated data and saves time and resources for controlling and correcting the migrated data in the target repository 2.

In addition, a reporting module can be deployed for providing details on the migration process to operators.

According to embodiments, the reporting module can group the elements according to associated similarity scores, and, for those that are matched and discrepancy identified (failed element) according to type of failure. The type of failure may comprise the columns of the data structures that are different between migrated data and target data, for instance; and/or the migration rule that is implied, etc.

In addition, some automated failure analysis can be deployed.

The Data quality assurance module 3 may derives the data mapping requirements and migration rules defined in case the failure has occurred due to the difference in the structure of a table, column, or schema.

Furthermore, in a step S7, an RCA module may perform a root cause analysis of detected failed records, i.e. elements (simulated or target data) that are matched and indicated with a discrepancy and are mapped with data requirements (migration rules). Records might be dissimilar due to discrepancy in or more field/column value, duplicated records, difference in defined data structure . . . .

This feature may utilize NLP (Natural Language Processing) algorithms to distinguish between table name and failed column/field. In case of a failure occurred due to migration rule, the mechanism fetches the corresponding requirement description from the data requirements (i.e. the repository of management rules 4) to denote the root cause.

For example, given the below SQL query:
SELECT*FROM employee
LEFT JOIN products
ON employee.emp_id=products.emp_id;

The mechanism can distinguish between column/field, table name, migration rule as:
Table name: employee, products
Column name (Joining by): emp_id
SQL operation: Left Join
Root Cause Analysis, RCA, allows users in charge of the data quality assurance to quick understand what the cause of discrepancies in the data migration could be, and, when appropriate, correct the migration rules so that to avoid further discrepancies.

A more precise process to derive root cause analysis may be as follows:
S1: Fetch failures from comparison/discrepancy results
S2: Preprocess failure columns from comparison/discrepancy results
S3: Identify the matching requirements for the failed column from data mapping/migration requirements, using NLP
S4: Derive migration rules from requirements for the failed columns
S5: Perform validation for each of the validation rule
S6: Identify failed validation rule specific to the failed column
S7: Map requirement to failed validation rule for the failed column
S8: Aggregate failures by RCA based on failed columns and RCA for a migration table Example for such RCA are provided in the table below:

| | Example 1 | Example 2 |
|---|---|---|
| S1 | [emp_id]: {source: 0001001, target: 1001} | [emp_type]: {source: P, target: NULL} |
| S2 | emp_id | emp_type |
| S3 | SELECT * FROM employee LEFT JOIN products ON employee.emp_id = products.emp_id; | |
| S4 | Migration_Rule, Max_Length, Data_Type | Max_Length, Allowable_values |
| S5 | Leading Zeros, 10, numeric | NULL |
| S6 | Migration_Rule: Failed, Max_Length: Passed, Data_Type: Passed | Max_Length: Passed, Allowable_values: Failed |
| S7 | Migration_Rule: Add three leading zeros for identifiers less than 5 | Allowable_values: P, T, C |

In step S6, then, for example 1, it is determined that the migration rule has failed. In step S7, the root cause for this failure is determined that the data does not comply with the leading zeros requirement.

In example 2, the step S6 determines that the "allowable values" of the target data structure failed. In step S7, the root cause is determined that the data does not comply with the P, T, C requirement.

In step S8, it can be further determined lists of failures that are linked to this same RCA:

| | Example 1 | Example 2 |
|---|---|---|
| S8 | Migration Rule: 15 Failures, Allowable_values: 5 Failures | Allowable_values: 10 Failures |

So, 15 elements (e.g. rows) in failure (i.e. represent discrepancies in the migrated data) and are linked to this root cause of migration rule failure in example 1, and 10 elements in allowable values rule failure in example 2.

A person of skill in the art would readily recognize that steps of various above-described methods can be performed by programmed computers. Such computers may include memory. Such computers may include one or more processing units. As known in the art, processing units can be implemented as any electronic device capable of processing, receiving, or transmitting data or instructions. For example, the processing unit may be, e.g., a microprocessor, a central processing unit (CPU), an application-specific integrated circuit (ASIC), a digital signal processor (DSP), or other similar devices, or combinations a such devices. The term "processing unit" is meant to encompass a single processor or processing unit, multiple processors, multiple processing units, or other suitably configured computing element or elements, that, either alone or in combination, are configured to perform as described. Such computers may include non-transitory computer-readable storage devices. Such non-transitory computer-readable storage devices may include instructions that, when performed by the computer, may perform specific steps. Each step may be implemented by a different software module or as a part of a common software module. Many embodiments are possible and accessible to the skilled person knowledgeable in software engineering.

What is claimed is:

1. A method for controlling data quality assurance after a migration between a source repository, comprising source data associated with a source data structure, and a target repository, comprising target data associated with a target data structure, said migration comprising one or more of an Extract, Load and Transform (ELT) or Extract, Transform and Load (ETL) process, according to which source data are extracted, transformed and loaded into a data warehouse before being migrated into target data according to migration rules, wherein said target data is organized as a set of elements, said method comprising:
    simulating said migration by applying said migration rules to source data of said source repository so as to output simulated data according to said target data structure, wherein said simulated data is organized as a set of elements;
    merging said simulated data and said target data by excluding identical elements, to form an input vector for a machine learning algorithm with the remaining elements of the set of elements;
    applying said machine learning algorithm for pairing elements of said input vector according to a similarity score; and
    determining discrepancies indicator according to said similarity score for each element of said input vector, by comparing said similarity score for a given pair to a threshold, the discrepancies indicator of the elements of the given pair indicating a discrepancy that cannot be automatically corrected when the similarity score is lower than the threshold and otherwise, a discrepancy that can be automatically corrected.

2. The method of claim 1, wherein said source repository is a relational database or flat files, which can be deployed in a premise or in a cloud.

3. The method of claim 1, wherein said target repository is a JSON or XML data repository or tables/flat files without primary keys.

4. The method of claim 1, where said machine learning algorithm is a Minhash LSH algorithm.

5. The method of claim 1, wherein a similarity score is determined for each pair between an element of said simulated data and an element of said target data and elements are paired when said similarity score is above a given threshold.

6. The method of claim 1, wherein said target repository is in a cloud or in premise.

7. The method of claim 1, further comprising steps of extraction and preprocessing said simulated data and said target data, wherein preprocessing comprises handling of missing values, trimming of white spaces, selecting common columns and converting each column values to arrays of strings.

8. The method of claim 1, further comprising a step of performing a root cause analysis of elements of said input vector that have not been paired.

9. The method of claim 1, further comprising a step of reporting, comprising grouping elements of said input vector according to said similarity score and to a type of failure.

10. A non-transitory computer-readable medium comprising a computer program comprising instructions which, when the computer program is executed by a computer, cause the computer to perform a method comprising:
    simulating said migration by applying said migration rules to source data of said source repository so as to output simulated data according to said target data structure, wherein said simulated data is organized as a set of elements;
    merging said simulated data and said target data by excluding identical elements, to form an input vector for a machine learning algorithm with the remaining elements of the set of elements;
    applying said machine learning algorithm for pairing elements of said input vector according to a similarity score; and
    determining discrepancies indicator according to said similarity score for each element of said input vector, by comparing said similarity score for a given pair to a threshold, the discrepancies indicator of the elements of the given pair indicating a discrepancy that cannot be automatically corrected when the similarity score is lower than the threshold and otherwise, a discrepancy that can automatically be corrected.

11. An apparatus for controlling data quality assurance after a migration between a source repository, comprising source data associated with a source data structure, and a target repository, comprising target data associated with a target data structure, said migration comprising one or more of an Extract, Load and Transform, ELT, or Extract, Transform and Load, ETL, process, according to which source data are extracted, transformed and loaded into a data warehouse before being migrated into target data according to migration rules, wherein said target data is organized as a set of elements, said apparatus comprising a means comprising at least one processor and at least one memory including computer program code, the at least one memory and computer program code configured to, with the at least one processor, cause the performance of the apparatus for:
    simulating said migration by applying said migration rules to source data of said source repository so as to output simulated data according to said target data structure, wherein said simulated data is organized as a set of elements;
    merging said simulated data and said target data by excluding identical elements, to form an input vector for a machine learning algorithm with the remaining elements of the set of elements;
    applying said machine learning algorithm for pairing elements of said input vector according to a similarity score; and
    determining discrepancies indicator according to said similarity score for each element of said input vector, by comparing said similarity score for a given pair to a threshold, the discrepancies indicator of the elements of the given pair indicating a discrepancy that cannot be automatically corrected when the similarity score is lower than the threshold and otherwise, a discrepancy that can automatically be corrected.

* * * * *